(12) United States Patent
Kumada et al.

(10) Patent No.: US 12,443,291 B2
(45) Date of Patent: Oct. 14, 2025

(54) OPERATION DEVICE, KEYBOARD DEVICE, AND ELECTRONIC APPARATUS

(71) Applicant: LENOVO (SINGAPORE) PTE. LTD., Singapore (SG)

(72) Inventors: Kimio Kumada, Yokohama (JP); Kazuyuki Kubota, Yokohama (JP); Takahide Wada, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 18/964,009

(22) Filed: Nov. 29, 2024

(65) Prior Publication Data

US 2025/0264944 A1    Aug. 21, 2025

(30) Foreign Application Priority Data

Feb. 16, 2024   (JP) ................... 2024-022180

(51) Int. Cl.
| | | |
|---|---|---|
| *G06F 3/0354* | (2013.01) | |
| *G06F 1/16* | (2006.01) | |
| *H01H 13/81* | (2006.01) | |
| *H01H 13/83* | (2006.01) | |

(52) U.S. Cl.
CPC .......... *G06F 3/03543* (2013.01); *G06F 1/169* (2013.01); *H01H 13/81* (2013.01); *H01H 13/83* (2013.01)

(58) Field of Classification Search
CPC ..... G06F 3/03543; G06F 1/169; H01H 13/81; H01H 13/83
See application file for complete search history.

(56) References Cited

U.S. PATENT DOCUMENTS

| | | | |
|---|---|---|---|
| 4,686,361 A * | 8/1987 | Bard .................. | G01D 5/30 250/221 |
| 2020/0019216 A1* | 1/2020 | Kubota ................ | G06F 1/169 |
| 2022/0091626 A1* | 3/2022 | Nøstvold ............ | G02B 27/30 |

* cited by examiner

*Primary Examiner* — Jonathan A Boyd
(74) *Attorney, Agent, or Firm* — SHIMOKAJI IP

(57) ABSTRACT

An operation device is a stick-type operation device configured to perform a tilt operation, and includes a support plate, a sensor substrate having a first through-hole in a plate thickness direction and supported by a front surface of the support plate, a support columnar member formed of a light-transmitting material and provided to stand up from one surface of the sensor substrate at a position where the first through-hole is blocked, an operation member having light-transmitting property and attached to the support columnar member, and a light source configured to irradiate the support columnar member with light through the first through-hole.

12 Claims, 9 Drawing Sheets

OPERATION DEVICE, KEYBOARD DEVICE, AND ELECTRONIC APPARATUS

BACKGROUND OF THE INVENTION

Field of the Invention

The present invention relates to an operation device, a keyboard device, and an electronic apparatus.

Description of the Related Art

In an electronic apparatus such as a laptop PC, there is a configuration in which a stick-type operation device is provided in a keyboard device to improve convenience of an input operation (for example, refer to Japanese Patent No. 6719605). The operation device is disposed, for example, near the center of the keyboard device, so that the operation device has high operability.

SUMMARY OF THE INVENTION

In general, an operation device is used only for an input operation for operating a cursor or the like displayed on a display.

By the way, in the operation device, for example, an operation member operated by hand is colored red. Accordingly, the operation device can exhibit its own designability that can also be a keyboard device or an icon of an electronic apparatus. Therefore, it is considered that the operation device can be used not only for improvement of designability but also for further improvement of user experience and cooperation with various functions as long as the operation member can be caused to emit light.

However, the above-described operation device is often very small, and there is a problem that it is not easy to mount a light emitting module due to the structure.

The present invention has been made in consideration of the above-described problems of the related art, and an object of the present invention is to provide an operation device, a keyboard device, and an electronic apparatus capable of causing an operation member to emit light.

An operation device according to a first aspect of the present invention is an operation device that is a stick-type operation device configured to perform a tilt operation, and the operation device includes: a support plate; a sensor substrate having a first through-hole in a plate thickness direction and supported by a front surface of the support plate; a support columnar member formed of a light-transmitting material and provided to stand up from one surface of the sensor substrate at a position where the first through-hole is blocked; an operation member having light-transmitting property and attached to the support columnar member; and a light source configured to irradiate the support columnar member with light through the first through-hole.

A keyboard device according to a second aspect of the present invention includes: a plate-like member; a plurality of key tops supported on an upper surface side of the plate-like member; and a stick-type operation device supported by the plate-like member, having an operation member disposed at a position where a periphery of the operation member is surrounded by the key tops, and configured to perform a tilt operation on the operation member, in which the operation device includes a support plate, a sensor substrate having a first through-hole in a plate thickness direction and supported by a front surface of the support plate, a support columnar member formed of a light-transmitting material and provided to stand up from one surface of the sensor substrate at a position where the first through-hole is blocked, an operation member having light-transmitting property and attached to the support columnar member, and a light source configured to irradiate the support columnar member with light through the first through-hole.

An electronic apparatus according to a third aspect of the present invention includes: a chassis; and a keyboard device mounted to face a surface of the chassis, in which the keyboard device includes a plate-like member, a plurality of key tops supported on an upper surface side of the plate-like member, and a stick-type operation device supported by the plate-like member, having an operation member disposed at a position where a periphery of the operation member is surrounded by the key tops, and configured to perform a tilt operation on the operation member, and the operation device includes a support plate, a sensor substrate having a first through-hole in a plate thickness direction and supported by a front surface of the support plate, a support columnar member formed of a light-transmitting material and provided to stand up from one surface of the sensor substrate at a position where the first through-hole is blocked, an operation member having light-transmitting property and attached to the support columnar member, and a light source configured to irradiate the support columnar member with light through the first through-hole.

According to the above-described aspect of the present invention, the operation member can be caused to emit light.

DETAILED DESCRIPTION OF THE INVENTION

Hereinafter, suitable embodiments operation device, a keyboard device, and an electronic apparatus according to the present invention will be described in detail with reference to the accompanying drawings.

Figure 1:
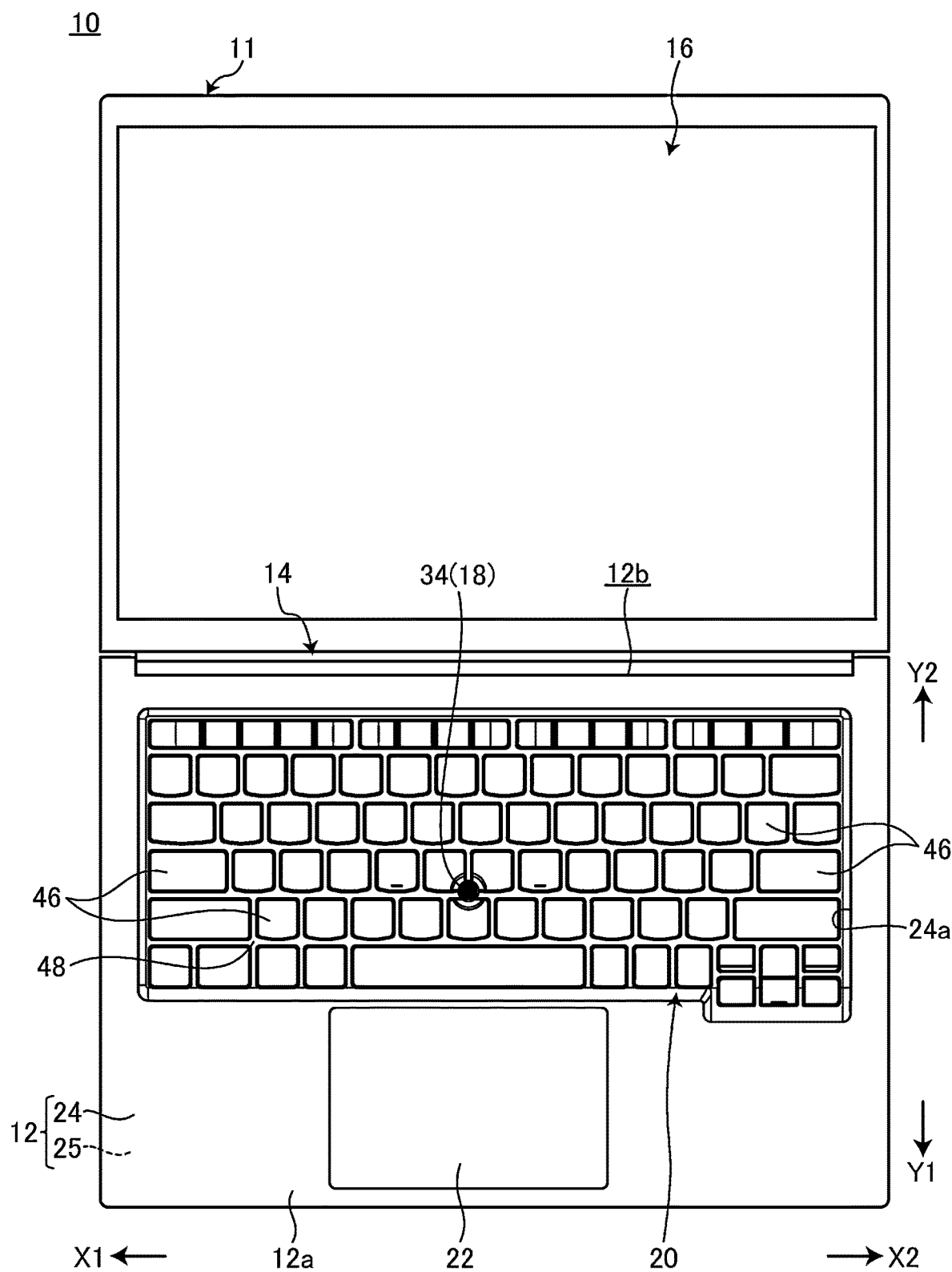
FIG. 1 is a top view of an electronic apparatus according to one embodiment.

FIG. 1 is a top view of an electronic apparatus 10 according to one embodiment. As illustrated in FIG. 1, the electronic apparatus 10 of the present embodiment is a clamshell-type laptop PC. The electronic apparatus 10 has a configuration in which a lid body 11 and a chassis 12 are connected to each other by a hinge 14 so as to be relatively rotatable.

The lid body 11 has a thin flat box-shaped chassis. The lid body 11 is provided with a display 16. The display 16 is, for example, an organic EL display or a liquid crystal display.

The chassis 12 is a thin flat box body. The chassis 12 mounts a keyboard device 20 including an operation device 18 according to one embodiment. The keyboard device 20 is installed to face the upper surface (surface 12a) of the chassis 12. Reference numeral 22 in FIG. 1 denotes a touch pad.

Hereinafter, the chassis 12 and each component mounted on the chassis 12 will be described with reference to a posture in which an operator operates the operation device 18 and the keyboard device 20, in which a width direction (left and right) of the chassis 12 will be referred to as X1 and X2 directions, a depth direction (front and back) of the chassis 12 will be referred to as Y1 and Y2 directions, and a thickness direction (up and down) of the chassis 12 will be referred to as Z1 and Z2 directions. The X1 and X2 directions may be collectively referred to as an X direction, and the Y1 and Y2 directions and the Z1 and Z2 directions may be similarly referred to as a Y direction and a Z direction, respectively. Each of these directions is a direction determined for convenience of description, and may be changed depending on a usage state, an installation posture, or the like of the electronic apparatus 10.

The chassis 12 is formed by overlapping a first cover material 24 and a second cover material 25 in the thickness direction and connecting the first cover material 24 and the second cover material 25 to be attachable and detachable to each other. The first cover material 24 forms, for example, an upper surface (surface 12a) and four circumferential side surfaces of the chassis 12, and has a substantially bathtub shape. The first cover material 24 has a large opening 24a having a substantially rectangular shape. The keyboard device 20 faces the Z1 side through the opening 24a. The second cover material 25 forms, for example, a lower surface of the chassis 12 and has a substantially flat plate shape. The hinge 14 is installed in a recessed hinge disposition groove 12b formed in a rear edge portion of the chassis 12 and connects the chassis 12 and the lid body 11 to each other.

Figure 2:
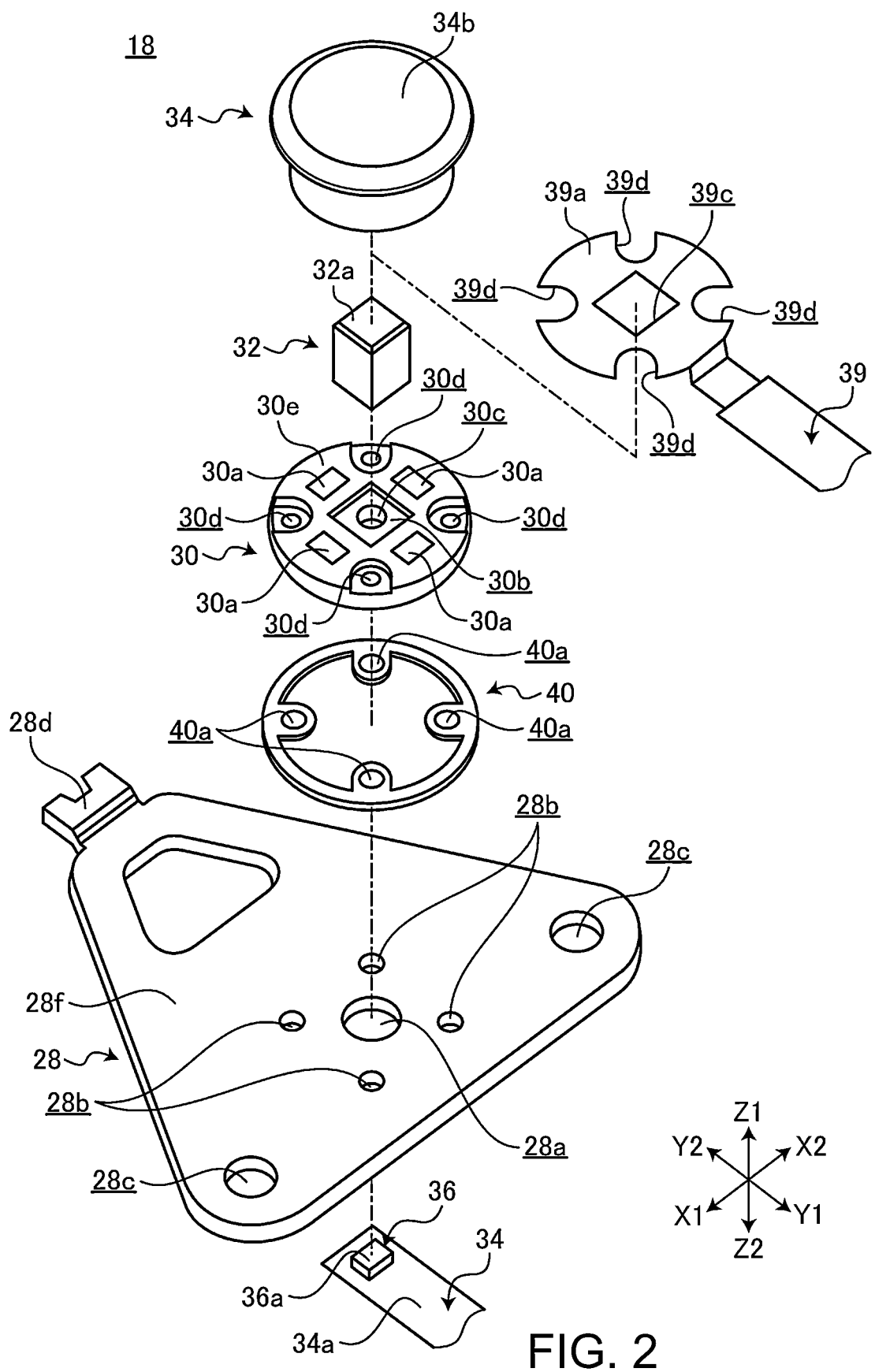
FIG. 2 is an exploded perspective view of an operation device.
Figure 3:
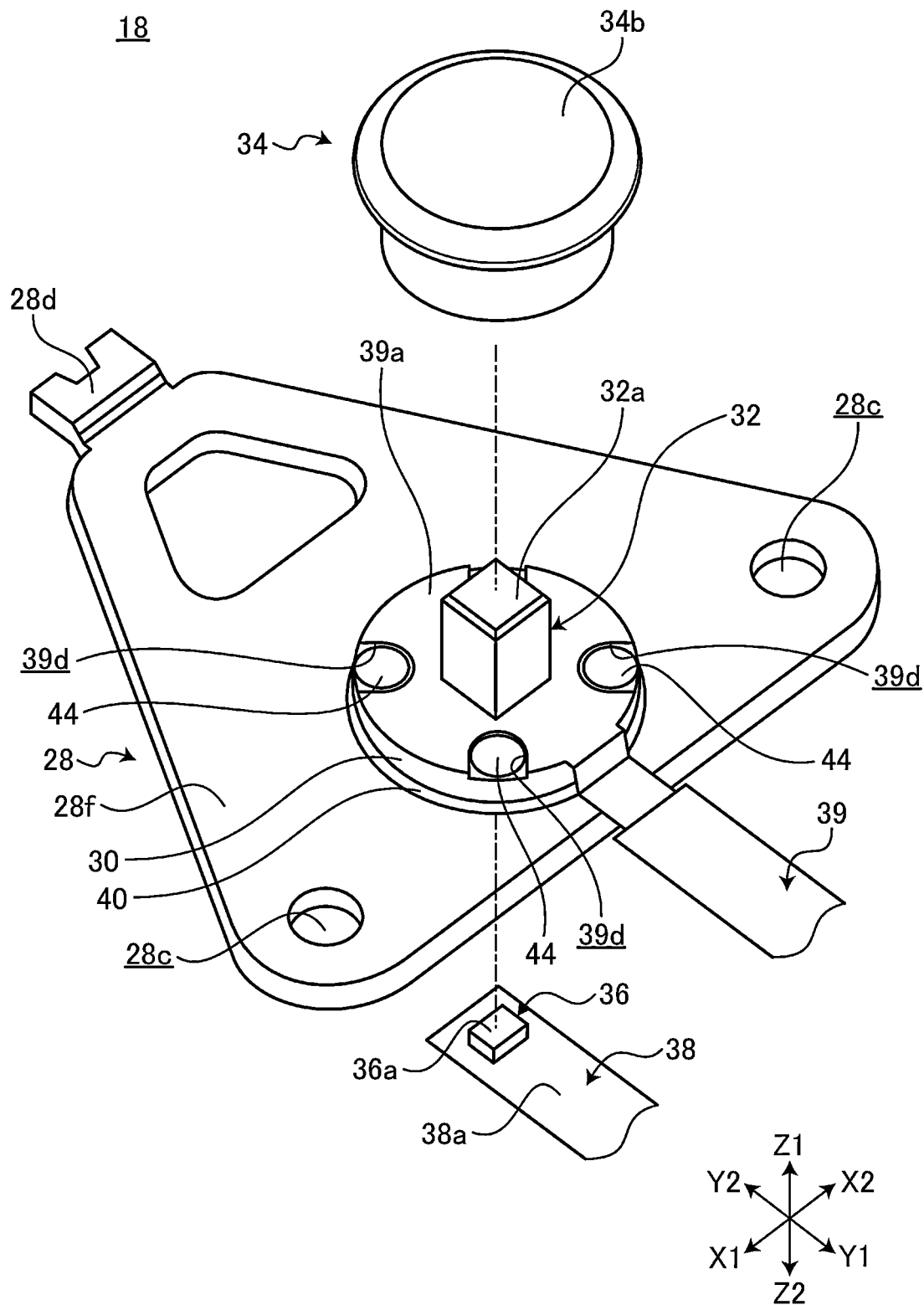
FIG. 3 is an exploded perspective view of a part of the operation device illustrated in FIG. 2 assembled.
Figure 4:
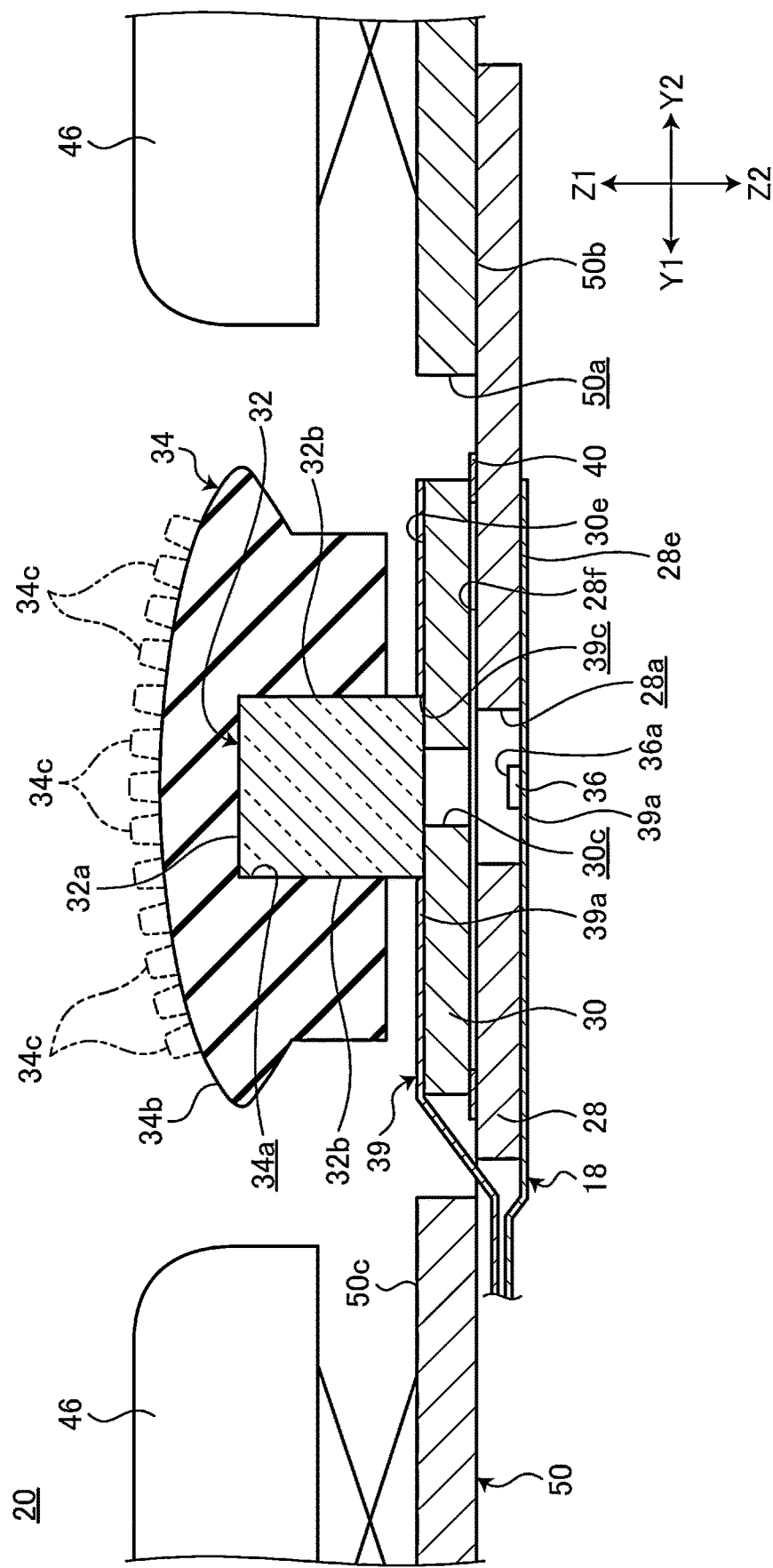
FIG. 4 is a schematic side cross-sectional view of the operation device and a keyboard device in a peripheral portion of the operation device.

FIG. 2 is an exploded perspective view of the operation device 18. FIG. 3 is an exploded perspective view of a part of the operation device 18 illustrated in FIG. 2 assembled. FIG. 4 is a schematic side cross-sectional view of the operation device 18 and a keyboard device 20 in a peripheral portion of the operation device.

As illustrated in FIGS. 2 to 4, the operation device 18 can include a support plate 28, a sensor substrate 30, a support columnar member 32, an operation member 34, a light source 36, and two wires 38 and 39.

As illustrated in FIG. 1, the operation device 18 is attached to the vicinity of the center of the keyboard device 20. The operation device 18 is a pointing device also called a pointing stick or a track point (registered trademark). That is, the operation device 18 is a stick-type input device that can perform a tilt operation on the operation member 34 by hand. The operation device 18 can operate a cursor (mouse pointer) displayed on the display 16 instead of the mouse. The operation device 18 can perform the same operation as a mouse in cooperation with, for example, a plurality of function buttons assigned to the touch pad 22. These function buttons correspond to, for example, left and right buttons or a center button of a mouse.

As illustrated in FIGS. 2 to 4, the support plate 28 is a member that serves as a base of the operation device 18. The support plate 28 is also a bracket for attaching the operation device 18 to the keyboard device 20. The support plate 28 can be formed of a metal plate formed of a thin steel plate, a stainless steel plate, an aluminum plate, or the like. The support plate 28 can have, for example, a substantially triangular shape that is tapered toward the Y2 side in a plan view. The support plate 28 may have a rectangular shape or the like. A plate thickness of the support plate 28 is, for example, 0.5 mm.

A through-hole 28a and a plurality of support holes 28b are provided at a position slightly toward the Y1 side of the center of the support plate 28. The through-hole 28a penetrates the support plate 28 in a plate thickness direction. The through-hole 28a has an inner diameter into which the light source 36 can be inserted. For example, four support holes 28b are provided to surround the periphery of the through-hole 28a. The support holes 28b are used to fix the sensor substrate 30 to the support plate 28.

A pair of attachment holes 28c and 28c and an engagement portion 28d are provided around corner portions of the support plate 28. The attachment hole 28c and the engagement portion 28d are used for attaching the operation device 18 to the keyboard device 20. Each attachment hole 28c is a screw hole into which a screw 53 (see FIG. 5) for fixing the support plate 28 to the keyboard device 20 is tightened. The engagement portion 28d is engaged with an engagement piece 54 formed on a plate-like member 50 of the keyboard device 20, which will be described later.

The sensor substrate 30 is a printed circuit board assembly (PCBA) on which a sensor 30a that detects the tilt operation with respect to the operation member 34 is mounted. As illustrated in FIG. 2, the sensor substrate 30 has a plurality of sensors 30a, a recessed portion 30b, a through-hole 30c, and a plurality of support holes 30d. In FIG. 4, the recessed portion 30b and the like are not illustrated.

For example, four sensors 30a are provided to surround the recessed portion 30b located at the center of the sensor substrate 30. The sensors 30a are respectively disposed in four directions along an XY direction as viewed from the center of the sensor substrate 30. The sensor 30a may be any sensor as long as it can detect a tilt movement of the operation member 34, and is, for example, a strain gauge type load sensor.

The recessed portion 30b is a recessed portion having a shallow counterbore shape formed at the center of a Z1-side surface (one surface 30e) of the sensor substrate 30. A lower end portion of the support columnar member 32 is fitted into and fixed to the recessed portion 30b by adhesion. Therefore, an inner peripheral shape of the recessed portion 30b is a shape corresponding to an outer peripheral shape of the support columnar member 32. The recessed portion 30b of the present embodiment has a rectangular shape.

The through-hole 30c is formed at the center of the sensor substrate 30 and penetrates the sensor substrate 30 in the plate thickness direction. That is, the through-hole 30c penetrates the bottom surface of the recessed portion 30b. The through-hole 30c is disposed coaxially with the through-hole 28a of the support plate 28 and communicates with the through-hole 28a. An inner diameter of the through-hole 30c can be formed to be smaller than an inner diameter of the through-hole 28a of the support plate 28 into which the light source 36 is inserted.

For example, four support holes 30d are provided to surround the recessed portion 30b at the center of the sensor substrate 30. Each support hole 30d penetrates the sensor substrate 30 in a plate thickness direction. Each support hole 30*d* is disposed between the adjacent sensors 30*a* and 30*a*. The support holes 30*d* are used to fix the sensor substrate 30 to the support plate 28.

The sensor substrate 30 is supported by the support plate 28 with, for example, a ring-shaped metal washer 40 interposed therebetween. Four hole portions 40*a* corresponding to the respective support holes 30*d* are formed to penetrate the ring-shaped portion of the metal washer 40. Each hole portion 40*a* is coaxially disposed with each support hole 30*d* and communicates with each support hole 30*d*. A shallow counterbore shape recessed portion is formed around the one surface 30*e* side of the support hole 30*d*.

The support columnar member 32 constitutes an operation lever of the operation device 18. The support columnar member 32 has, for example, a prismatic shape (quadrangular prism shape) having two upper and lower surfaces and four outer peripheral surfaces. The support columnar member 32 can also be formed of, for example, a polygonal prism or the like of which the outer periphery is formed of six surfaces. The support columnar member 32 can also be formed in a columnar shape.

The support columnar member 32 is provided to stand up from one surface 30*e* of the sensor substrate 30. A lower end portion (Z2-side end portion) of the support columnar member 32 is fitted to the recessed portion 30*b* of the sensor substrate 30 and is fixed by adhesion. Accordingly, the support columnar member 32 stands up from the one surface 30*e* in the Z1 direction at a position where the through-hole 30*c* is blocked.

The support columnar member 32 is formed of a material (light-transmitting material) that can transmit light. The support columnar member 32 can be formed of, for example, transparent or translucent polycarbonate. The support columnar member 32 is fixed to the sensor substrate 30 using, for example, a heat curable adhesive. Therefore, the support columnar member 32 is preferably formed of, for example, a heat-resistant material having a heat resistance of about 180° C.

The operation member 34 is a member that is actually operated by the operator with a fingertip or the like. The operation member 34 is, for example, an umbrella-attached cylindrical member formed in a substantially dome shape or a substantially mushroom shape. A fitting hole 34*a* is open at the center of the lower surface (Z2-side surface) of the operation member 34. The fitting hole 34*a* is a recessed hole that does not penetrate the operation member 34 in the Z direction. The support columnar member 32 is inserted into the fitting hole 34*a* from the upper end portion (Z1-side end portion) and fitted. The operation member 34 can also be fixed to the support columnar member 32 by adhesion or the like.

The upper surface (Z1-side surface) of the operation member 34 can be formed in a dome shape or an umbrella shape that is easy to operate with a fingertip. A plurality of protrusions 34*c* can also be arranged in a circular shape on the upper surface (operation surface 34*b*) of the operation member 34 as illustrated by two-dot chain lines in FIG. 4. The protrusion 34*c* functions as a non-slip for a fingertip or the like and improves the operability with respect to the operation member 34.

The operation member 34 is formed of, for example, a rubber material. The operation member 34 is colored, for example, red. The operation member 34 has the fitting hole 34*a* formed in the center, and a rubber cap that is formed to be thin as a whole. As a result, the operation member 34 has light-transmitting property in the thickness direction.

The light source 36 is, for example, an LED element. The light source 36 may emit white light or may emit light of a color (for example, red) matching the color of the operation member 34.

In the configuration example illustrated in FIG. 4, the light source 36 is installed in the through-hole 28*a* of the support plate 28. In the light source 36, for example, an upper surface (Z1-side surface) is a light irradiation surface 36*a*. The light irradiation surface 36*a* faces the Z1 direction (the support columnar member 32 side) in the through-hole 28*a*, and thus the light can be applied to the support columnar member 32 through the through-hole 28*a* and the through-hole 30*c*. Although details will be described later, light incident on the support columnar member 32 is guided and diffused in the support columnar member 32, and the operation member 34 emits light.

The wire (first wire) 38 is a wire for light emission control that electrically connects the light source 36 and a control board 42 (see FIG. 5) described later. The wire (second wire) 39 is a wire for a stick operation control that electrically connects the sensor substrate 30 and the control board 42. The wires 38 and 39 can be configured with, for example, flexible printed circuits (FPC).

The wire 38 is disposed such that one end portion (first end portion 38*a*) thereof passes through a back surface (Z2-side surface) 28*e* side of the support plate 28 and covers the through-hole 28*a*. The light source 36 is mounted on a surface of a portion of the first end portion 38*a* that covers the through-hole 28*a*. Accordingly, at least a part of the light source 36 is disposed in the through-hole 28*a*.

In the wire 39, one end portion (first end portion 39*a*) passes from one surface 30*e* of the sensor substrate 30 to the front surface (Z1-side surface) 28*f* side of the support plate 28. The first end portion 39*a* of the wire 39 is formed in a circular shape having, for example, a shape substantially the same as the outer shape of the sensor substrate 30. An opening portion 39*c* and a plurality of notches 39*d* are formed in the first end portion 39*a* (see FIGS. 2 and 3). The opening portion 39*c* is a rectangular cutout hole into which the support columnar member 32 is inserted. The notch 39*d* is a portion that is cut out to recess the outer peripheral edge portion of the first end portion 39*a*, and is disposed coaxially with each support hole 30*d*.

As illustrated in FIGS. 2 to 4, in the assembly structure of the operation device 18, the sensor substrate 30 is disposed on the front surface 28*f* of the support plate 28 via the metal washer 40. The through-holes 28*a* and 30*c* are disposed coaxially, and an inner peripheral opening of the metal washer 40 is also disposed between the through-hole 28*a* and the through-hole 30*c*. The caulking pin 44 is inserted into the through-holes 28*a* and 30*c*, for example, from the Z1 side toward the Z2 side (see FIG. 3). The caulking pin 44 connects the sensor substrate 30 and the support plate 28 to each other, for example, by caulking both upper and lower ends in a flange shape.

The first end portion 39*a* of the wire 39 is connected to one surface 30*e* of the sensor substrate 30 connected to the support plate 28. The wire 38 is disposed on the back surface 28*e* of the support plate 28, and the light source 36 is inserted into the through-hole 28*a*. The second end portions 38*b* and 39*b* of the respective wires 38 and 39 are connected to the control board 42, respectively (see FIG. 5). That is, at least two wires 38 and 39 branch off from the control board 42 and extend. An assembly structure of the operation device 18 is constructed as described above.

Next, an example of a mounting structure of the operation device 18 to the keyboard device 20 will be described.

As illustrated in FIGS. 1 and 4, the keyboard device 20 includes a plurality of key tops 46 disposed to be arranged in the X direction and the Y direction. The adjacent key tops 46 and 46 are partitioned by an isolation frame 48. The isolation frame 48 is a mesh-like plate in which a plurality of hole portions into which each key top 46 is inserted to be vertically movable is formed. The isolation frame 48 may be integrally molded with the first cover material 24 forming the surface 12a of the chassis 12, or may be configured to be separate from the first cover material 24.

As illustrated in FIG. 4, the keyboard device 20 includes a plate-like member 50 that serves as an attachment plate for each key top 46. The plate-like member 50 is a laminated plate having a three-layer structure including, for example, a base plate, a membrane sheet laminated on a Z1-side surface of the base plate, and a waterproof sheet laminated on a Z2-side surface of the base plate. The base plate can be configured such that cutting-raising or cutting-out is performed at various portions of a thin metal plate such as stainless steel. The membrane sheet can be configured with a switch sheet in which a fixed contact and a movable contact are closely attached to each other to close the contact in a case where a position where the fixed contact and the movable contact overlap each other is pressed. The waterproof sheet can be provided to cover the lower surface side of the base plate. Instead of the waterproof sheet, a light guide plate that guides and reflects light emitted from a light source such as a predetermined LED element and irradiates each key top 46 with light from below can also be installed.

Figure 5:
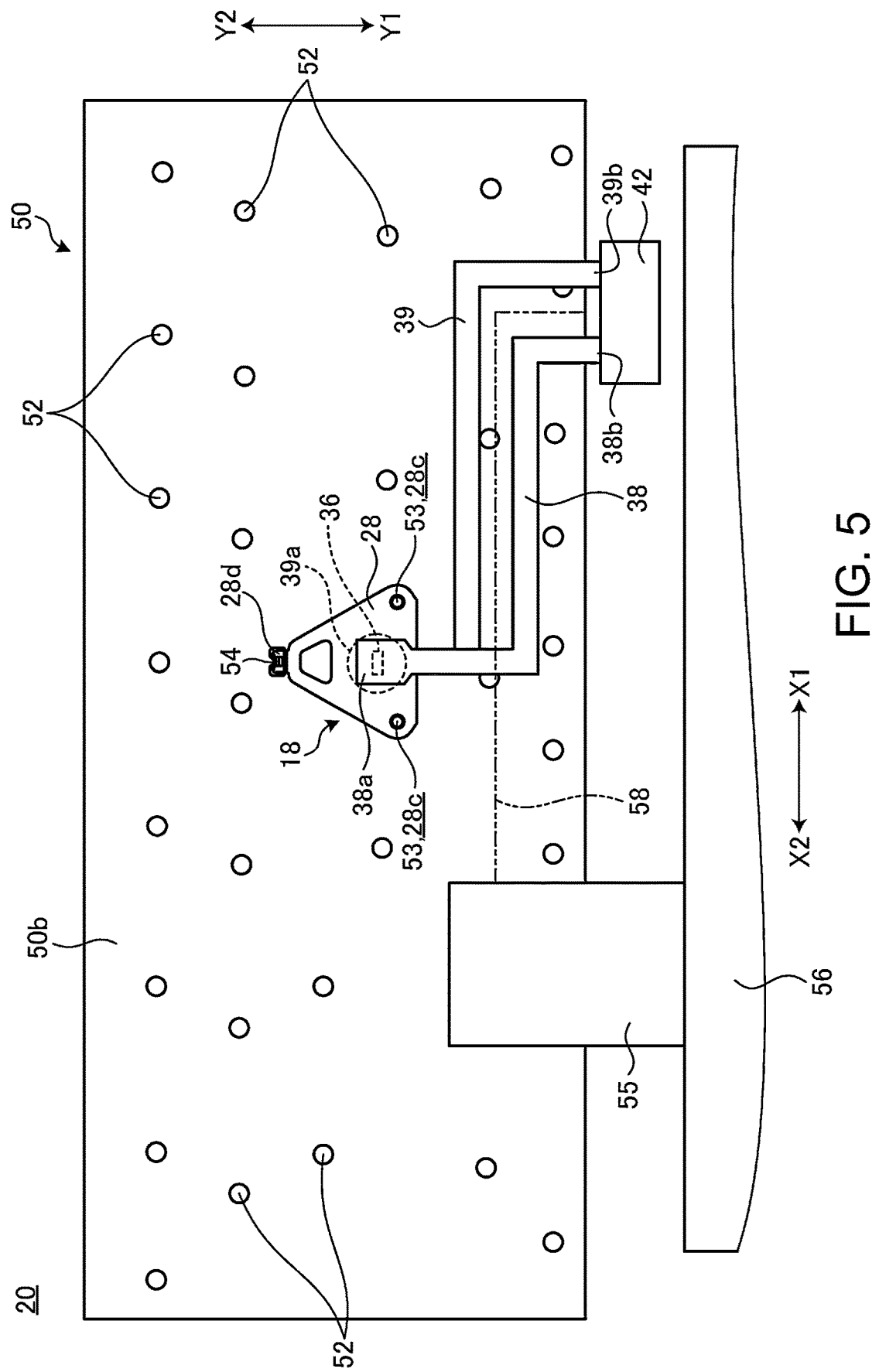
FIG. 5 is a schematic bottom view of the keyboard device.

FIG. 5 is a schematic bottom view of the keyboard device 20.

As illustrated in FIG. 5, the plate-like member 50 is screwed and fixed to the isolation frame 48 by a screw 52 that penetrates the plate-like member 50 from the lower surface (Z2-side surface) in the Z1 direction, and thus the plate-like member 50 is attached to the chassis 12.

As illustrated in FIGS. 4 and 5, the plate-like member 50 has a hole portion 50a that penetrates in a plate thickness direction. The operation device 18 is installed in the hole portion 50a. In the mounting structure of the operation device 18 to the keyboard device 20, the support plate 28 is fixed to the lower surface 50b side of the plate-like member 50. In the support plate 28, for example, the attachment hole 28c is fixed to the plate-like member 50 with the screw 53, and the engagement portion 28d is engaged with the engagement piece 54 cut and raised from the support plate 28.

The support columnar member 32 passes through the hole portion 50a from the Z2 side to the Z1 side, and thus protrudes to the upper surface 50c side of the plate-like member 50. The sensor substrate 30 can be disposed in the hole portion 50a. An operation member 34 is mounted on an upper portion of the support columnar member 32 inserted through the hole portion 50a. Accordingly, the operation device 18 is attached to the keyboard device 20. In other words, a keyboard device 20 to which the operation device 18 is attached is configured. The operation member 34 is disposed near the center of the keyboard device 20, and the periphery of the operation member 34 is surrounded by the key tops 46 (see FIGS. 1 and 4).

The wire 38 is provided to extend from the back surface 28e side of the support plate 28 to the lower surface 50b side of the plate-like member 50. The second end portion 38b of the wire 38 is connected to, for example, the control board 42 installed below or on the side of the keyboard device 20.

The wire 39 is provided to pass from the one surface 30e side of the sensor substrate 30 to the front surface 28f side of the support plate 28 and to be extended to the lower surface 50b side of the plate-like member 50. The two wires 38 and 39 can be laminated by overlapping a part near the first end portions 38a and 39a on the support plate 28 side with each other. The second end portion 39b of the wire 39 is connected to the control board 42 separately from the wire 38.

As illustrated in FIG. 5, the keyboard device 20 is connected to a motherboard 56 by using a flexible printed circuit (FPC) 55. The motherboard 56 is a printed circuit board assembly (PCBA) that performs main control of the electronic apparatus 10. The motherboard 56 can mount various electronic components such as a central processing unit (CPU), a graphics processing unit (GPU), a storage device, and a communication module. The control board 42 of the operation device 18 can join the flexible printed circuit 55, for example, by using a flexible printed circuit 58 different from the wires 38 and 39, and can be connected to the motherboard 56.

Next, the light emission operation and the effects of the operation device 18 will be described.

Figure 6:
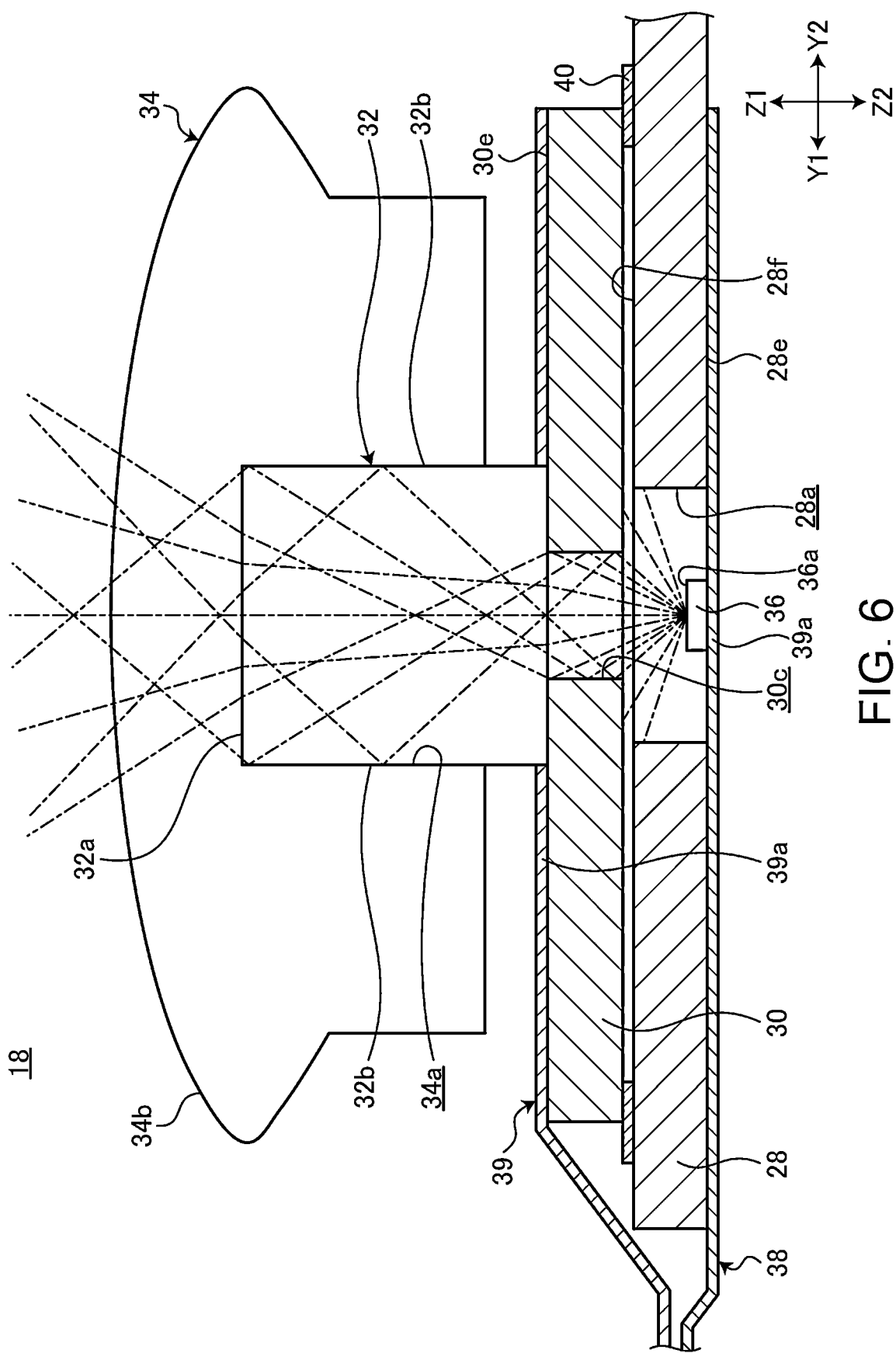
FIG. 6 is a schematic side cross-sectional view illustrating a light emission operation of the operation device.

FIG. 6 is a schematic side cross-sectional view illustrating the light emission operation of the operation device 18. In FIG. 6, the cross-sectional hatching of the support columnar member 32 and the operation member 34 is not illustrated, and the same applies to FIGS. 7 and 8. An arrow illustrated by a one-dot chain line in FIG. 6 schematically illustrates a trajectory of the light emitted from the light source 36, and the same applies to FIGS. 7 and 8.

In the operation device 18 of the configuration example (first configuration example) illustrated in FIG. 6, the light irradiation surface 36a of the light source 36 is disposed to face the Z1 side in the through-hole 28a of the support plate 28. That is, the light irradiation surface 36a faces the through-hole 30c of the sensor substrate 30 and the support columnar member 32 at the end of the through-hole 30c.

In the operation device 18, the light emitted from the light irradiation surface 36a passes through the through-hole 28a and the through-hole 30c, and at the same time, is reflected by the inner peripheral wall of the through-hole 30c while passing through the through-hole 30c. The light that has passed through the through-hole 30c is guided and diffused by the support columnar member 32 formed of a light-transmitting material. In this way, the support columnar member 32 functions as a light guide member. Since the support columnar member 32 has a prismatic shape, the introduced light is reflected by the outer circumferential side surface 32b of the support columnar member 32 and is efficiently diffused. Then, the light guided by the support columnar member 32 passes through the Z1-side surface (upper surface 32a) of the support columnar member 32 and is appropriately refracted to cause the operation member 34 to emit light from the inside. Since the operation member 34 is a thin rubber member, the light guided by the support columnar member 32 is widely emitted from the entire operation member 34.

As described above, the operation device 18 can include the support columnar member 32 that is formed of a light-transmitting material and is provided to stand up from one surface 30e of the sensor substrate 30 at a position at which the through-hole 30c is blocked, the operation member 34 that has light-transmitting property and is attached to the support columnar member 32, and the light source 36 that irradiates the support columnar member 32 with light through the through-hole 30c.

As described above, the operation device 18 uses the support columnar member 32 on which the operation member 34 is mounted as the light guide member. Accordingly, the operation device 18 can cause the operation member 34 to emit light by light passing through the through-hole 30c of the sensor substrate 30. Therefore, although the operation device 18 has a simple configuration in which the light source 36 is substantially added to the pointing stick in the related art, the operation device 18 can efficiently cause the operation member 34 to emit light. In particular, in a case where the operation device 18 is mounted on the keyboard device 20, the diameter of the operation member 34 is extremely small, for example, about 8 mm. Even in this case, since the operation device 18 has the above-described simple configuration, the operation member 34 can be caused to emit light.

In the electronic apparatus 10 including the keyboard device 20, the operation member 34 emits light, so that not only the designability is improved, but also the user experience can be further improved and cooperation with various functions can be achieved.

For example, the electronic apparatus 10 can notify that the power of the apparatus is turned on or that the memory is being trained by the light emission of the operation member 34 after a power button is pressed and before the display 16 is displayed. For example, the electronic apparatus 10 can notify of a mute state or the like of a speaker or a microphone by the light emission of the operation member 34. For example, the electronic apparatus 10 can notify that the electronic apparatus 10 is in a sleep state by the light emission of the operation member 34.

In addition, the operation device 18 can include the wire 38 in which the light source 36 is mounted on the first end portion 38a and which passes through the back surface 28e side of the support plate 28, the wire 39 through which the first end portion 39a is connected to the sensor substrate 30 and which passes through the front surface 28f side of the support plate 28, and the control board 42 to which the second end portions 38b and 39b of the respective wires 38 and 39 are connected, respectively.

In this way, in the operation device 18, the wires 38 and 39 connected to the light source 36 and the sensor substrate 30 are branched off at the control board 42 and pass through the back surface 28e side and the front surface 28f side of the support plate 28, respectively. As a result, the operation device 18 can connect the wires 38 and 39 while having a simple configuration in which only the wire 38 on which the light source 36 is substantially mounted is added to the pointing stick in the related art. In particular, in a case where the operation device 18 is mounted on the keyboard device 20, the operation member 34 is extremely small and the surrounding space is also limited. Even in this case, the operation device 18 includes the above-described wires 38 and 39, so that the wire 39 required for the control signal and the wire 38 required for the light emission can be easily connected to each other.

Figure 7:
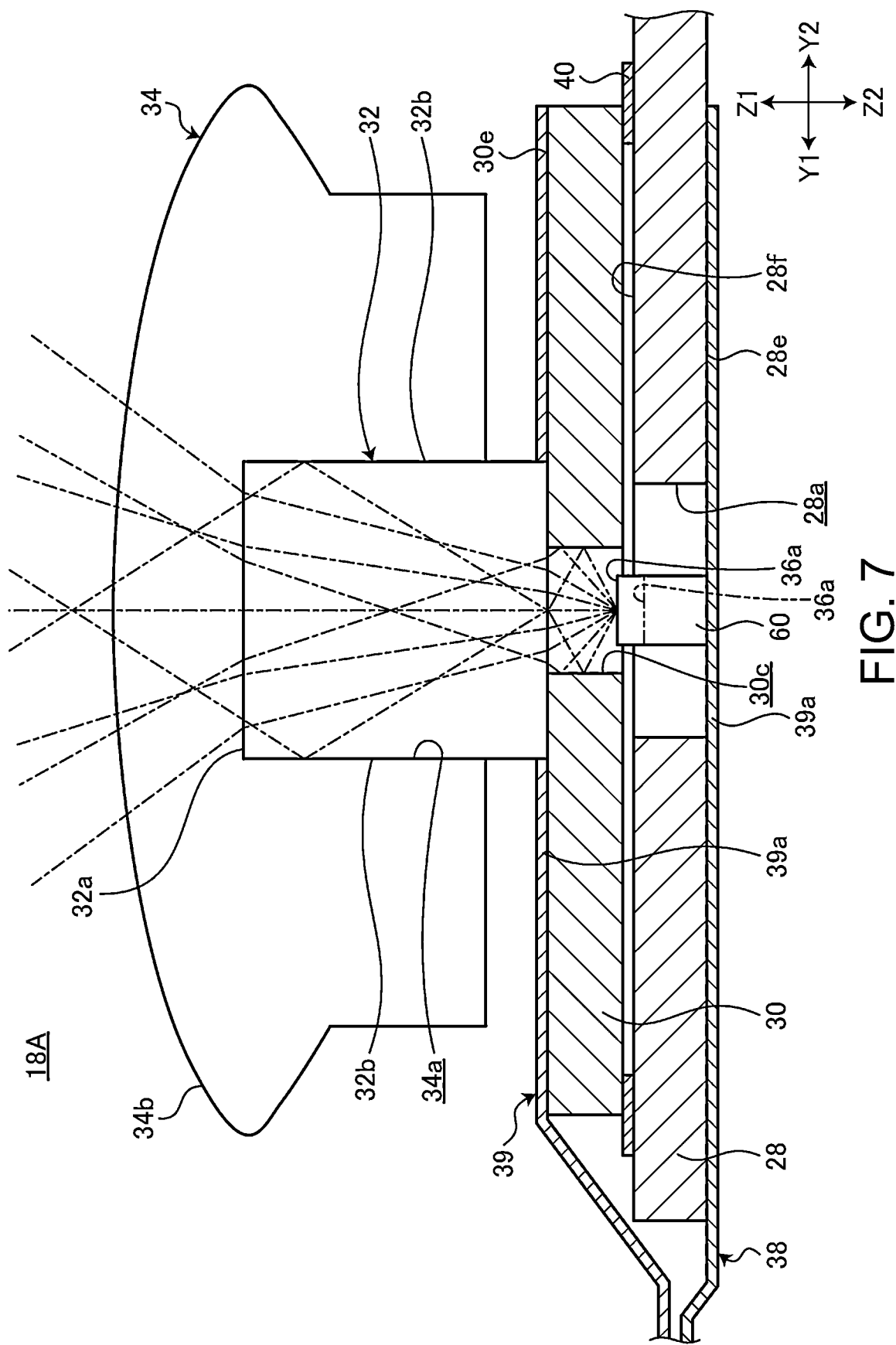
FIG. 7 is a schematic side cross-sectional view illustrating a light emission operation of an operation device according to a second configuration example.

FIG. 7 is a schematic side cross-sectional view illustrating a light emission operation of an operation device 18A according to the second configuration example. In FIG. 7, the same reference numerals as the reference numerals illustrated in FIGS. 1 to 6 indicate the same or similar configurations, and thus, detailed description thereof will be omitted since the same or similar functions and effects are exhibited, and the same applies to FIGS. 8 and 9.

The operation device 18A illustrated in FIG. 7 includes a light height larger than that of the light source 36 illustrated in FIG. 6 in the Z direction. The light source 60 has, for example, a Z-direction height larger than the Z-direction height of the through-hole 28a, that is, the plate thickness of the support plate 28. Accordingly, the light irradiation surface 36a of the light source 60 is disposed in, for example, the through-hole 30c of the sensor substrate 30 and faces the Z1 side.

In the operation device 18A, the light emitted from the light irradiation surface 36a passes through the through-hole 30c and simultaneously passes through the through-hole 30c while being reflected by the inner peripheral wall of the through-hole 30c. The light that has passed through the through-hole 30c is guided by the support columnar member 32 formed of a light-transmitting material, and is diffused while being reflected by the outer circumferential side surface 32b. Then, the light guided by the support columnar member 32 passes through the upper surface 32a of the support columnar member 32 and is appropriately refracted, and the operation member 34 emits light from the inside.

In the operation device 18A illustrated in FIG. 7, the light irradiation surface 36a is located at a position offset upward (Z1 side) as compared with the operation device 18 illustrated in FIG. 6. That is, the operation device 18A has the light irradiation surface 36a at a position closer to the light guide member (support columnar member 32) than the operation device 18. Therefore, the operation device 18A can widen the range of the light diffused from the support columnar member 32, and the light emission range of the operation surface 34b is expanded. As a result, in the operation device 18A, the operation member 34 emits light more evenly in a wider range.

For example, in a case where the diameter of the operation member 34 is 8 mm, the diameter of the light emission range on the operation surface 34b of the operation device 18 is 3.6 mm. Meanwhile, the diameter of the light emission range on the operation surface 34b of the operation device 18A is 4.4 mm.

As illustrated by two-dot chain lines in FIG. 7, the height of the light source 60 may be set such that the light irradiation surface 36a is disposed, for example, above (Z1 side) the through-hole 28a of the support plate 28.

Figure 8:
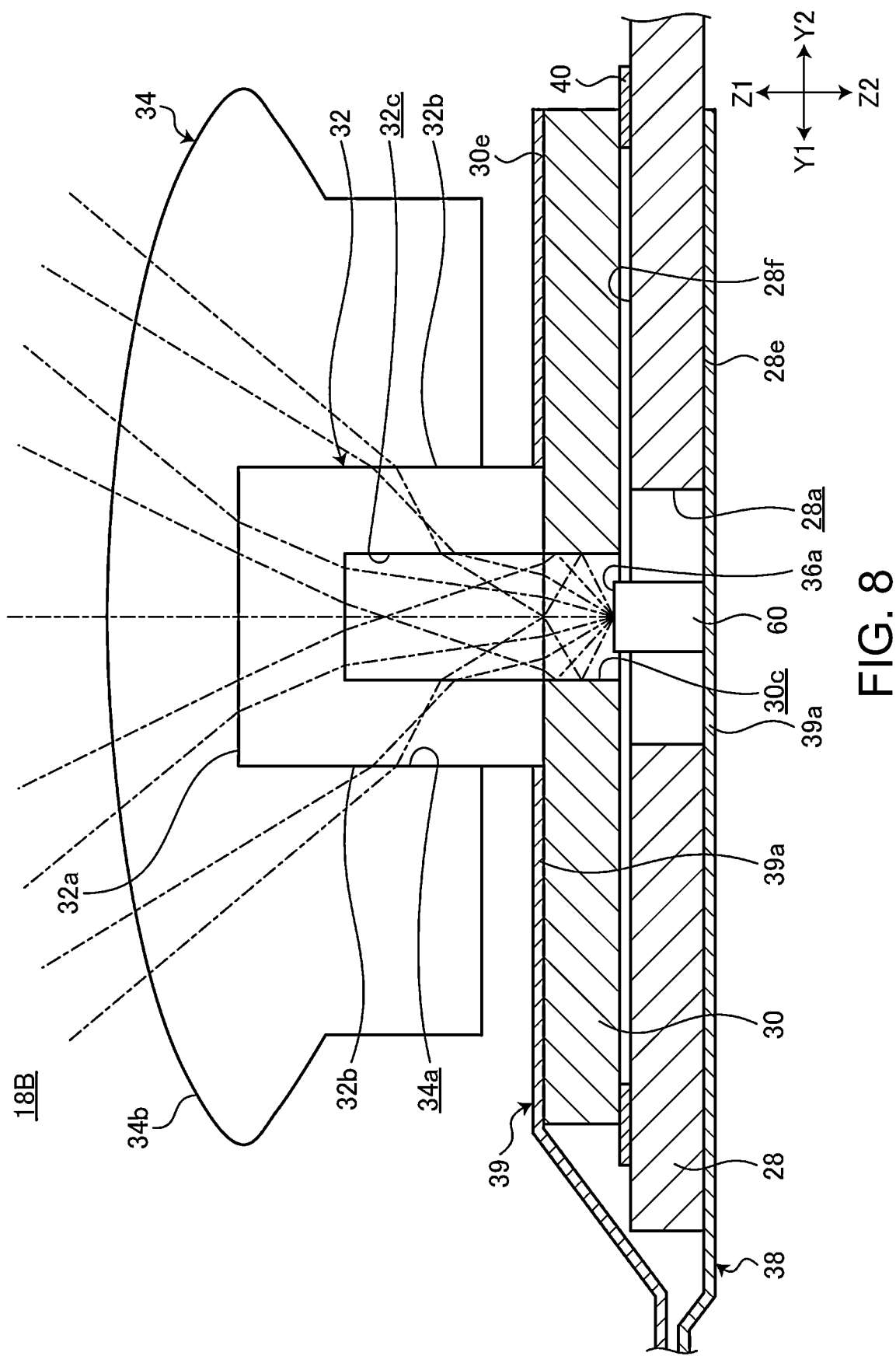
FIG. 8 is a schematic side cross-sectional view illustrating a light emission operation of an operation device according to a third configuration example.

FIG. 8 is a schematic side cross-sectional view illustrating a light emission operation of an operation device 18B according to a third configuration example.

The operation device 18B illustrated in FIG. 8 is different from the operation devices 18 and 18A illustrated in FIGS. 6 and 7 in that the support columnar member 32 has a recessed hole portion 32c. The hole portion 32c is a prismatic hole having the same shape as the shape of the support columnar member 32. The hole portion 32c is open on the lower surface (Z2-side surface) of the support columnar member 32 and communicates with the through-holes 30c and 28a. The back portion (upper portion) of the hole portion 32c is closed.

In the operation device 18B, the light emitted from the light irradiation surface 36a passes through the through-hole 30c and simultaneously passes through the through-hole 30c while being reflected by the inner peripheral wall of the through-hole 30c. The light that has passed through the through-hole 30c is introduced into the hole portion 32c of the support columnar member 32. The light introduced into the hole portion 32c is reflected and refracted by an inner peripheral wall surface of the hole portion 32c. The light that has passed through the hole portion 32c is then guided by the support columnar member 32 formed of a light-transmitting material, and is diffused while being reflected by the outer circumferential side surface 32b. Then, the light guided by the support columnar member 32 passes through the upper surface 32a of the support columnar member 32 and is appropriately refracted, and the operation member 34 emits light from the inside.

In the operation device 18B illustrated in FIG. 8, the support columnar member 32 has the hole portion 32c as compared with the above-described operation devices 18 and 18A, so that light is further dispersed in a lateral direction. Therefore, the operation device 18B can further widen the range of the light diffused from the support columnar member 32, and the light emission range of the operation surface 34b is further expanded. As a result, in the operation device 18, the operation member 34 emits light more evenly in a wider range.

FIG. 8 illustrates a configuration in which the light source 60 that is higher than the light source 36 illustrated in FIG. 6 is used. However, the hole portion 32c of the support columnar member 32 can also be used in combination with the light source 36 illustrated in FIG. 6.

For example, in a case where the diameter of the operation member 34 is 8 mm, the diameter of the light emission range on the operation surface 34b in the operation device 18B is 6.8 mm. In the operation device 18B using the support columnar member 32 having the hole portion 32c, in a case where the light source is changed to the low-profile light source 36, the diameter of the light emission range on the operation surface 34b is 5.4 mm.

Figure 9:
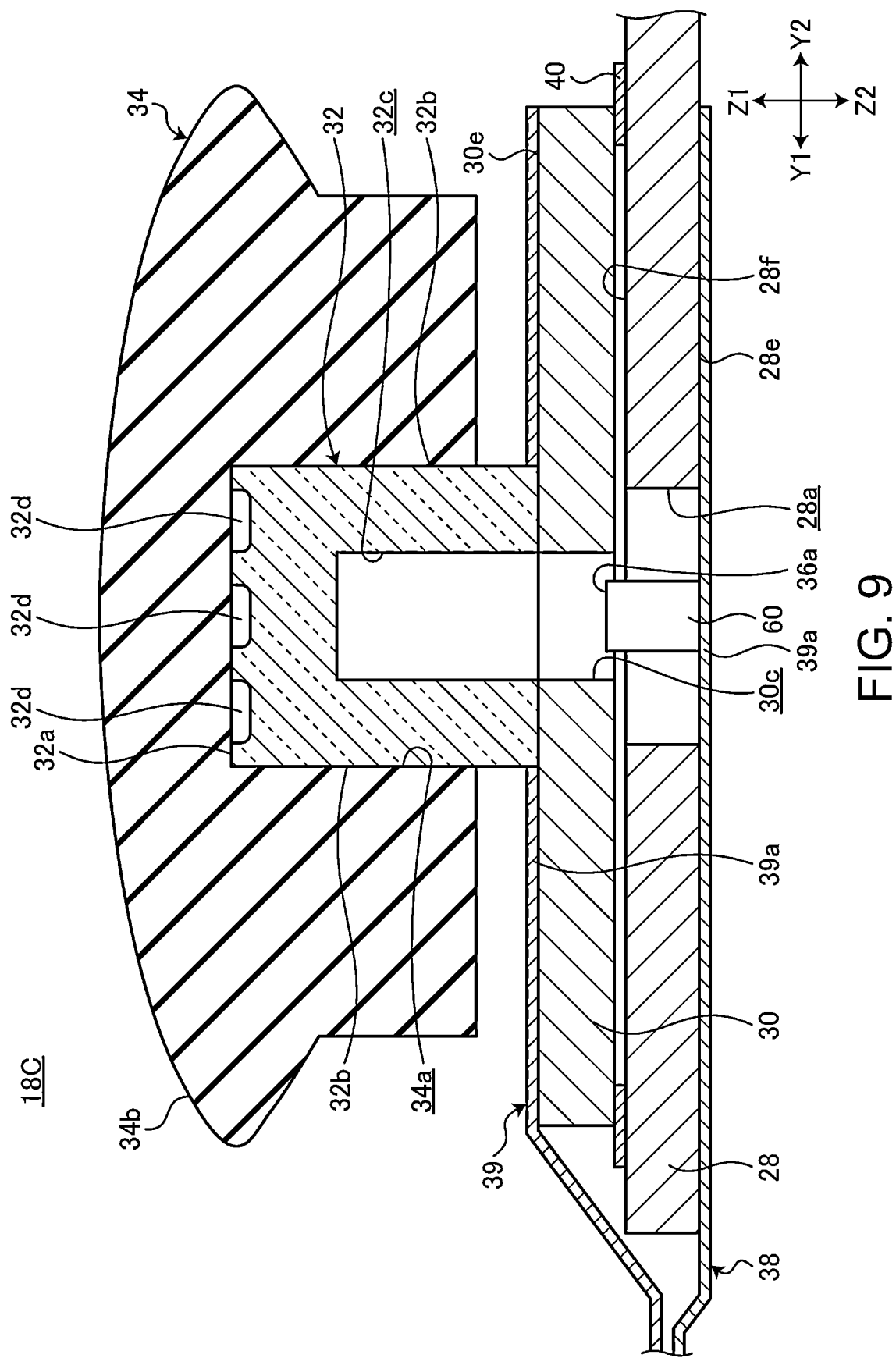
FIG. 9 is a schematic side cross-sectional view illustrating a light emission operation of an operation device according to a fourth configuration example.

FIG. 9 is a schematic side cross-sectional view illustrating a light emission operation of an operation device 18C according to the fourth configuration example.

The operation device 18C illustrated in FIG. 9 is different from the operation devices 18, 18A, and 18B illustrated in FIGS. 6 to 8 in that the support columnar member 32 has embossed portions 32d on the upper surface 32a. The embossed portion 32d is a minute unevenness formed on the upper surface 32a. As a result, the upper surface 32a of the support columnar member 32 is formed to have a sand-blasted surface by the embossed portions 32d.

In the operation device 18C, the light emitted from the light irradiation surface 36a passes through the through-hole 30c and simultaneously passes through the through-hole 30c while being reflected by the inner peripheral wall of the through-hole 30c. The light that has passed through the through-hole 30c is introduced into the hole portion 32c of the support columnar member 32. The light introduced into the hole portion 32c is reflected and refracted by an inner peripheral wall surface of the hole portion 32c. The light that has passed through the hole portion 32c is then guided by the support columnar member 32 formed of a light-transmitting material, and is diffused while being reflected by the outer circumferential side surface 32b. In addition, in a case where the light guided by the support columnar member 32 passes through the upper surface 32a of the support columnar member 32, the light is diffusely reflected by the embossed portion 32d and is appropriately refracted, and the operation member 34 emits light from the inside.

In the operation device 18C illustrated in FIG. 9, the support columnar member 32 has the embossed portion 32d, and thus light is diffusely reflected, compared to the operation devices 18, 18A, and 18B. Therefore, the operation device 18C can suppress the occurrence of unevenness (unevenness of light) in the light diffused from the support columnar member 32, and the operation member 34 emits light more evenly.

FIG. 9 illustrates an example of a configuration in which a light source 60 that is higher than the light source 36 illustrated in FIG. 6 is used. However, the embossed portion 32d can also be used in combination with the light source 36 illustrated in FIG. 6. In addition, FIG. 9 illustrates an example of a configuration in which the support columnar member 32 having the hole portion 32c illustrated in FIG. 8 is used. However, the embossed portion 32d can also be formed on the support columnar member 32 that does not have the hole portion 32c illustrated in FIGS. 6 and 7.

It goes without saying that the present invention is not limited to the embodiments described above, and is able to be freely modified without departing from the gist of the present invention.

In the above description, the operation devices 18, 18A to 18C are exemplified as being mounted on the keyboard device 20, but the operation devices 18, 18A to 18C can also be used as a single operation device. In addition, the keyboard device 20 including the operation devices 18, 18A to 18C can also be used as a single keyboard device without being mounted on the electronic apparatus 10.

The invention claimed is:

1. An operation device that is a stick-type operation device configured to perform a tilt operation, the operation device comprising:
   a support plate;
   a sensor substrate having a first through-hole in a plate thickness direction and supported by a front surface of the support plate;
   a support columnar member formed of a light-transmitting material and extends upwardly from one surface of the sensor substrate whereby the first through-hole is blocked;
   an operation member having light-transmitting property and attached to the support columnar member;
   a wire between the operation member and the sensor substrate, wherein the wire includes a planar portion configured to receive the support columnar member therein; and
   a light source configured to irradiate the support columnar member with light through the first through-hole.

2. The operation device according to claim 1,
   wherein the support plate has a second through-hole in the plate thickness direction and communicates with the first through-hole, and
   at least a part of the light source is disposed in the second through-hole.

3. The operation device according to claim 2,
   wherein the light source has a light irradiation surface configured to emit light, and
   the light irradiation surface is in the first through-hole or the second through-hole and faces a support columnar member side.

4. The operation device according to claim 1,
   wherein the support columnar member has an embossed portion on an upper surface thereof.

5. The operation device according to claim 1,
   wherein the support columnar member has a recessed hole portion communicating with the first through-hole.

6. The operation device according to claim 1,
   wherein the support columnar member has a prismatic shape.

7. A keyboard device comprising:
   a plate-like member;
   a plurality of key tops supported on an upper surface side of the plate-like member; and
   a stick-type operation device supported by the plate-like member, wherein the stick-type operation device has an operation member wherein a periphery of the operation member is surrounded by the key tops, and the stick-type operation device is configured to perform a tilt operation on the operation member,
   wherein the operation device includes:
   a support plate, a sensor substrate having a first through-hole in a plate thickness direction and supported by a front surface of the support plate, a support columnar member formed of a light-transmitting material and extends upwardly from one surface of the sensor substrate whereby the first through-hole is blocked, an operation member having light-transmitting property and attached to the support columnar member, a wire between the operation member and the sensor substrate, wherein the wire includes a planar portion configured to receive the support columnar member therein, and a light source configured to irradiate the support columnar member with light through the first through-hole.

8. The keyboard device according to claim 7, wherein the plate-like member has a hole portion extending in the plate thickness direction, and in the operation device, the support plate is fixed to a lower surface side of the plate-like member, and the support columnar member protrudes to the upper surface side of the plate-like member through the hole portion.

9. The keyboard device according to claim 8, wherein the support plate has a second through-hole in the plate thickness direction and that communicates with the first through-hole, and at least a part of the light source is disposed in the second through-hole, the keyboard device further comprises:

another wire that extends from a back surface side of the support plate to the lower surface side of the plate-like member and has a mounting surface on which the light source is mounted.

10. The keyboard device according to claim 9, wherein the operation device includes a control board connected to the sensor substrate, and the another wire is connected to the control board.

11. An electronic apparatus comprising:

a chassis; and a keyboard device that faces a surface of the chassis, wherein the keyboard device includes a plate-like member, a plurality of key tops supported on an upper surface side of the plate-like member, and a stick-type operation device supported by the plate-like member, wherein the stick-type operation device has an operation member wherein a periphery of the operation member is surrounded by the key tops, and the stick-type operation device is configured to perform a tilt operation on the operation member, and the operation device includes:

a support plate, a sensor substrate having a first through-hole in a plate thickness direction and supported by a front surface of the support plate, a support columnar member formed of a light-transmitting material and extends upwardly from one surface of the sensor substrate whereby the first through-hole is blocked, an operation member having light-transmitting property and attached to the support columnar member, a wire between the operation member and the sensor substrate, wherein the wire includes a planar portion configured to receive the support columnar member therein, and a light source configured to irradiate the support columnar member with light through the first through-hole.

12. The electronic apparatus according to claim 11, wherein the support plate has a second through-hole in the plate thickness direction and that communicates with the first through-hole, and at least a part of the light source is disposed in the second through-hole the keyboard device further comprises:

another wire having a surface on which the light source is mounted; and a control board to which the another wire is connected; and a motherboard electrically connected to the control board.

* * * * *